(12) United States Patent
Pericoli

(10) Patent No.: US 10,081,560 B2
(45) Date of Patent: Sep. 25, 2018

(54) INTEGRATED PLANT FOR THE TREATMENT OF MEDICAL LABORATORY WASTE

(71) Applicant: NEWSTER TECHNOLOGIES S.p.A., Serravalle (SM)

(72) Inventor: Marco Pericoli, Rimini (IT)

(73) Assignee: NEWSTER TECHNOLOGIES S.p.A., Serravalle (SM)

( * ) Notice: Subject to any disclaimer, the term of this patent is extended or adjusted under 35 U.S.C. 154(b) by 290 days.

(21) Appl. No.: 14/915,409

(22) PCT Filed: Sep. 8, 2014

(86) PCT No.: PCT/IB2014/002017
§ 371 (c)(1),
(2) Date: Feb. 29, 2016

(87) PCT Pub. No.: WO2015/033218
PCT Pub. Date: Mar. 12, 2015

(65) Prior Publication Data
US 2016/0207804 A1   Jul. 21, 2016

(30) Foreign Application Priority Data
Sep. 9, 2013   (IT) .............................. RN2013A0035

(51) Int. Cl.
| C02F 1/66 | (2006.01) |
|---|---|
| C02F 1/00 | (2006.01) |
| C02F 1/28 | (2006.01) |
| C02F 1/32 | (2006.01) |
| C02F 103/00 | (2006.01) |

(52) U.S. Cl.
CPC ............... *C02F 1/66* (2013.01); *C02F 1/006* (2013.01); *C02F 1/283* (2013.01); *C02F 1/325* (2013.01); *C02F 2103/003* (2013.01); *C02F 2209/06* (2013.01); *C02F 2303/26* (2013.01)

(58) Field of Classification Search
None
See application file for complete search history.

(56) References Cited

U.S. PATENT DOCUMENTS

2009/0283409 A1   11/2009   Stern et al.

FOREIGN PATENT DOCUMENTS

| SU | 435196 A1 | 7/1974 |
|---|---|---|
| SU | 1043114 A1 | 9/1983 |
| SU | 1502482 A1 | 8/1989 |

OTHER PUBLICATIONS

International Search Report and Written Opinion dated Feb. 2, 2015 for related PCT application No. PCT/IB2014/002017.
Australian Examination Report dated Nov. 6, 2017 for counterpart Australian Application No. 2014316773.
European Examination Report dated Jun. 8, 2017 for counterpart European Application No. 14812590.9.
Russian Search Report dated Jan. 15, 2018 for counterpart Russian Application No. 2016112280/05(019352).

*Primary Examiner* — Richard C Gurtowski
(74) *Attorney, Agent, or Firm* — Shuttleworth & Ingersoll, PLC; Timothy Klima

(57) ABSTRACT

An integrated plant for the treatment of medical laboratory waste includes at least a container for collecting the waste and a loading pump which transfers separate quantities of waste to a tank, in such a way that the plant operates thanks to gravity with intermittent cycles. A method for the treatment of the waste allows the separation of a liquid part, which is discharged into the sewers after a specific treatment.

18 Claims, 3 Drawing Sheets

US 10,081,560 B2

INTEGRATED PLANT FOR THE TREATMENT OF MEDICAL LABORATORY WASTE

This application is the National Phase of International Application PCT/IB2014/002017 filed Sep. 8, 2014 which designated the U.S. and that International Application was published under PCT Article 21(2) in English.

This application claims priority to Italian Application No. RN2013A000035 filed Sep. 9, 2013, which application is incorporated by reference herein.

TECHNICAL FIELD

This invention relates to an integrated plant for the treatment of medical laboratory waste.

In terms of what is generally defined as "medical" laboratory waste, it must be said that it may be extremely diverse depending on the type of laboratory and therefore the type of activities carried out there.

Several particular examples, significant but without being exhaustive, may refer to waste water from clinical laboratories, which may contain organic mercury compounds, mercury and other heavy metals, organic chemical substances, blood and bodily fluids, formaldehyde, buffers, diluted mineral acids and bases, phosphates, oxidisers, oil.

Waste discharged from research laboratories may be even more diverse, since it may contain oxidisers (such as bleach, iodine, peroxides and others), radionuclides, proteins deriving from tissues, oil and grease from equipment, heavy metals from analytical reagents, organic solvents, phosphates and detergents used for cleaning and sterilising instruments.

A particular risk is posed by waste from chemical—clinical analysis laboratories, usually harmful due to the presence of solvents and other highly toxic reagents, as well as fixer and developer liquids from radiological departments.

BACKGROUND ART

In general, in the prior art, laboratories collect all of the waste produced, classing it according to the type and placing it in suitable containers, so as to avoid mixing incompatible chemical products.

Such containers, usually in the form of polyethylene tanks, in different colours and easily sealable, are kept at the production sites in suitable areas and are strictly labelled and provided with technical sheets relating to the products they contain, if necessary updated repeatedly if successive top ups are carried out. Once full, the containers are picked up by companies authorised to transport, store and dispose of them, based on identification codes.

It is evident that such a path followed by the laboratory waste before it is actually disposed of requires significant involvement of personnel, means of transport, suitable storage areas, therefore requiring considerable organisational commitment with consequent economic cost, as well as not always guaranteeing correct disposal of the above-mentioned waste.

Another unsatisfactory aspect of said method is the risk of infection and bio-hazard, due to the presence of microorganisms in the waste, with the possibility that workers whose job is to handle and collect the waste will be infected by it.

DISCLOSURE OF THE INVENTION

The aim of this invention is, therefore, to reduce the limitations and eliminate the above-mentioned disadvantages.

The invention, as described in the claims, achieves this aim by means of a plant integrated in the structure of a laboratory, which carries out one treatment at a time on a predetermined quantity of waste, operating with intermittent cycles thanks to gravity.

The main advantage obtained by this invention is the division of the waste into a solid part, which will subsequently be disposed of at external plants, and a liquid part which in contrast is treated until it can be discharged directly into the public sewers.

A further advantage is basically the fact that there is a big reduction in the complexity and cost of waste collection, packaging and disposal steps, which are limited only to the solid part of the waste.

Another advantage deriving from the invention is the fact that, since it involves complete treatment in situ of the liquid part of the waste to be discharged into the sewers, the environmental and ecological risk for the outside is reduced. That is particularly true for underdeveloped countries, where one cannot take for granted the presence of a suitable sewage treatment plant.

Moreover, the invention allows a big reduction in the risk of infection for laboratory personnel, greatly reducing the number and dimensions of the waste containers, as well as manual and mechanical handling of them for starting disposal.

BRIEF DESCRIPTION OF THE DRAWINGS

Further advantages and features of the invention are more apparent in the detailed description which follows, with reference to the accompanying drawings, which illustrate an example embodiment of it without limiting the scope of the invention, in which.

DETAILED DESCRIPTION OF PREFERRED EMBODIMENTS OF THE INVENTION

Figure 1:
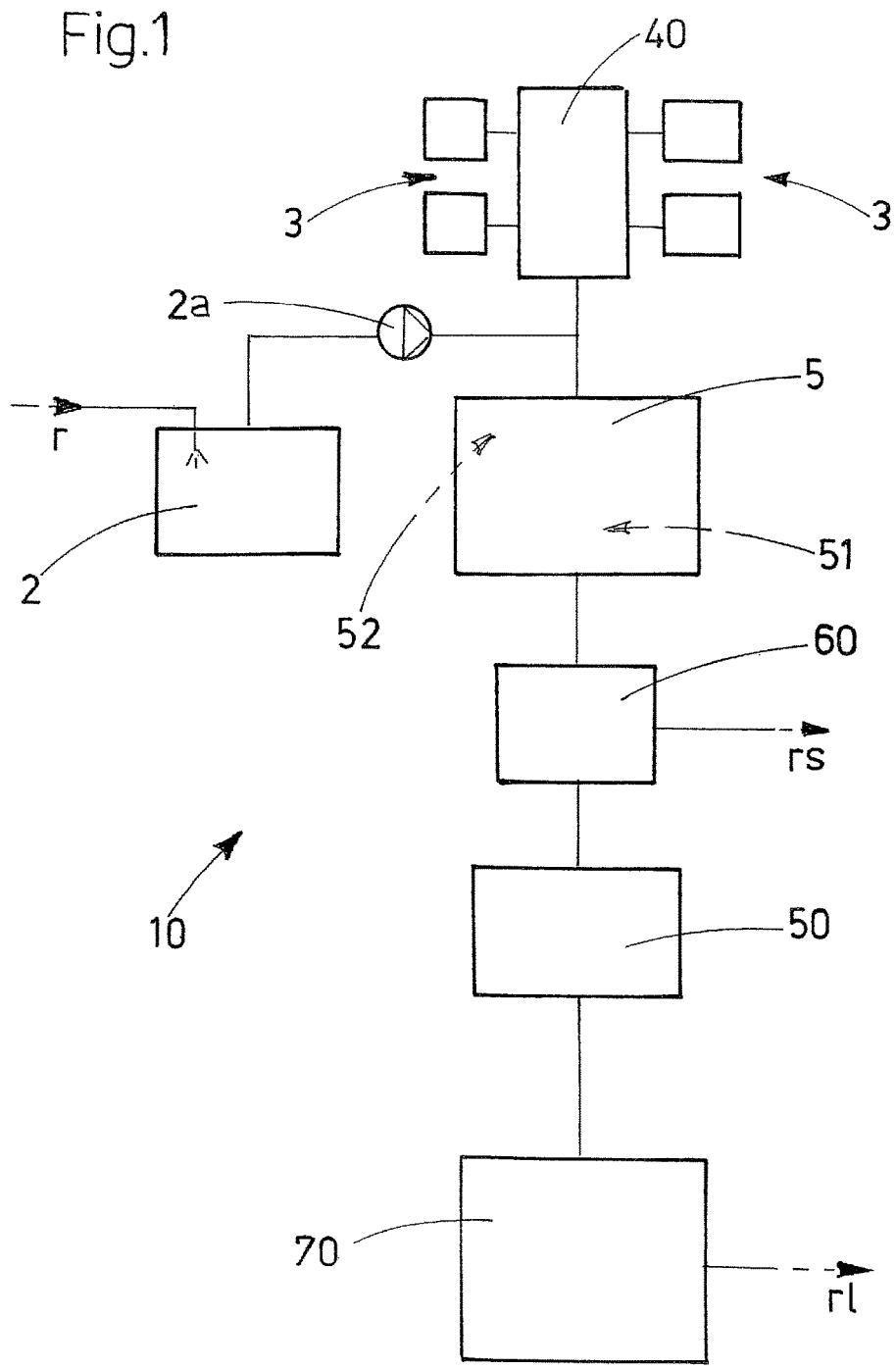
FIG. 1 is a general block diagram of the invention.
Figure 2:
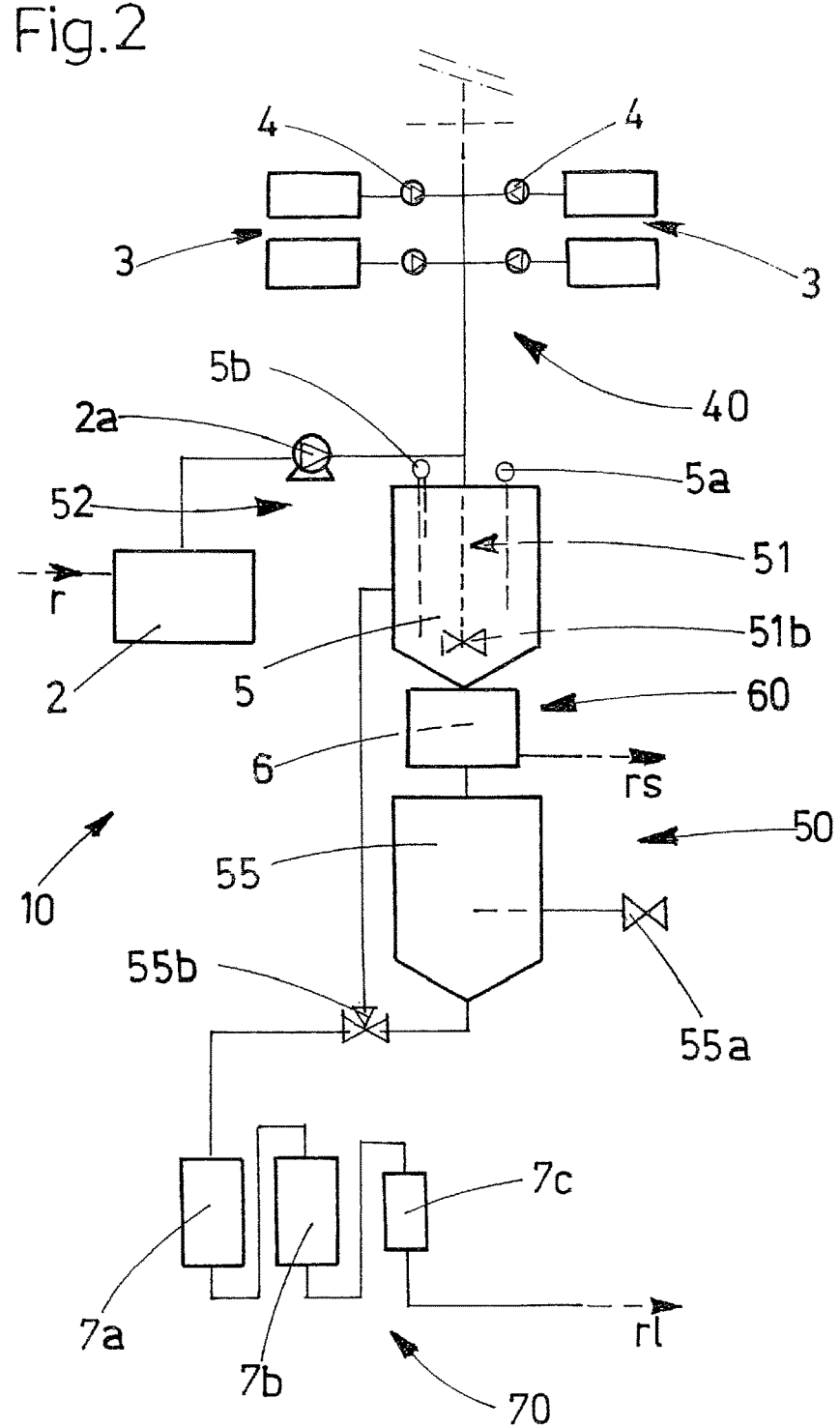
FIG. 2 is a block diagram of a preferred embodiment of the invention.

An integrated plant for the treatment of medical laboratory waste comprises a container 2 for collecting the waste r, and at least a loading pump 2a, designed to transfer separate quantities of waste r from the container 2, in such a way that the plant 10 operates with intermittent cycles thanks only to gravity.

The pump 2a is therefore only operated during the step of loading the plant 10, whilst the actual treatment of the waste r takes place while the pump 2a is not operating.

The plant 10 also comprises a plurality of chemical reagent containers 3 and related dosing means 40, and is provided with a tank 5, equipped with loading pump 2a control means 52, designed to receive both the waste r and the chemical reagents. The tank 5 is also provided with mixing means 51 for mixing the waste 1 and the chemical reagents.

The plant 10 also comprises filtering means 60, able to separate a solid part rs and a liquid part rl of the waste r mixed with the chemical reagents arriving from the tank 5;

and it also comprises treatment means 70 for treating the liquid part rl, in such a way that the latter can be discharged directly into the sewers in compliance with regulations.

The plant 10 also comprises checking means 50, interposed between the filtering means 60 and the treatment means 70, able to check that the quality of the liquid part rl of the waste is suitable for sending it to the treatment means 70.

In a preferred embodiment of the invention, the chemical reagent dosing means 40 comprise at least peristaltic pumps 4 for dosing each of the chemical reagents, and at least a pH detector probe 5a positioned in the tank 5, in such a way as to allow regulation of the quantity of chemical reagents in order to keep the pH within predetermined limits.

The loading pump 2a control means 52 comprise at least electronic level probes 5b, suitable for making the pump 2a start at the tank 5 minimum level and stopping it at the maximum level.

The filtering means 60 comprise at least a bag filter 6.

The mixing means 51 comprise at least a variable-speed electric mixer 51b, its speed to be determined according to the various steps of mixing the waste r and chemical reagents.

The treatment means 70 for treating the liquid part 1b comprise in succession at least a sand filter 7a, an activated charcoal filter 7b, a disinfection device 7c which uses UV lamps.

The checking means 50 comprise at least a vessel 55 for accumulation of the liquid part rl, equipped with a draw-off tap 55a which allows a check of the quality of the liquid part rl; and comprising a multi-way valve 55b, allowing the liquid part rl to be sent, as required, to the treatment means 70, or, alternatively, to the tank 5 to repeat the cycle. In particular, the significant parameter adopted for assessing the quality of the liquid part rl is the COD (Chemical Oxygen Demand) value, expressed in milligrams of oxygen per liter.

Figure 3:
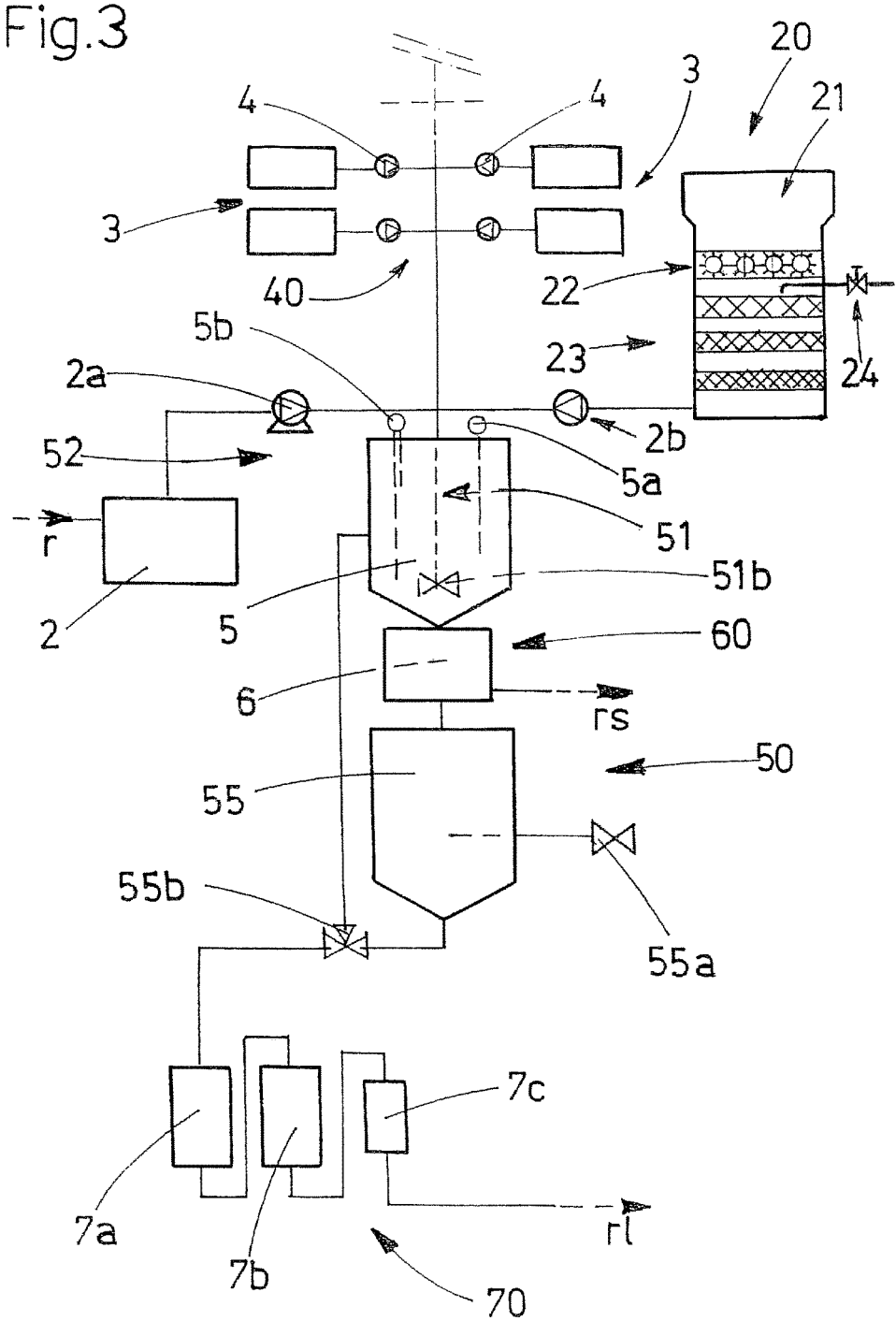
FIG. 3 is a block diagram of an alternative embodiment of the invention.

FIG. 3 shows a version of the plant 10 which is also suitable for treating pharmacological preparations, in particular able to convert into an aqueous solution expired medicines f in the solid phase or liquid phase contained in blister packs or similar packages.

For this purpose, the plant 10 comprises an apparatus 20, also operating thanks to gravity, constituted of an upper container 21 for collecting the medicines f, below which there are grinding rollers 22 and a set of grilles 23 made of mesh in decreasing sizes, to which the medicines f freely drop.

Between the grinding rollers 22 and the grilles 23 there is a tap 24 for the introduction of water, preferably obtained from the water mains and intended to facilitate the feed of the ground medicines f.

Downstream of the grilles 23 there is a second loading pump 2b, which feeds predetermined quantities to the tank 5, from which the treatment cycle proceeds thanks only to gravity in the way already described.

A method for the treatment of medical laboratory waste and/or expired medicines in a plant integrated with the laboratory comprises preliminary steps of introducing the waste r and/or medicines f into collection containers 2, 21, then having pumps 2a, 2b transfer a predetermined quantity of the waste r and/or medicines f into a tank 5 from where the treatment cycle proceeds thanks only to gravity. Chemical reagents are then introduced into the same tank 5, drawn from containers 3 by dosing means 40, in predetermined quantities proportional to the waste r and/or to the medicines f.

In said tank 5 the waste r, and/or the medicines f, and the chemical reagents are mixed together, by mixing means 51 according to predetermined speeds, times and methods. Simultaneously with said mixing action, the pH in the tank 5 is checked, with consequent refinement of the dosing of the chemical reagents, performed by the dosing means 40, in such a way as to keep the pH within predetermined limits.

The treated waste r and/or medicines f is/are then transferred from the tank 5 to filtering means 60, which separate out a solid part rs to be sent for disposal, and a liquid part rl to be further treated and then discharged into the sewers. Said liquid part rl is accumulated in a vessel 55, from which a sample of liquid is extracted to measure the COD.

At that point, after checking the acceptability of the COD value, the method comprises a step of sending the liquid part rl to the treatment means 70 and then to be discharged into the sewers. Alternatively, if the COD value is unacceptable, the liquid part rl is sent back into the tank 5 so that the cycle can be repeated.

The invention claimed is:

1. A plant for treatment of medical waste, comprising:
 a container for collecting the medical waste,
 a tank for receiving the medical waste from the container,
 a loading pump operatively positioned between the container and the tank for transferring the medical waste from the container to the tank,
 a plurality of chemical reagent containers,
 a chemical reagent pump for transferring chemical reagents from the chemical reagent containers to the tank,
 a mixer positioned in the tank for mixing the medical waste and chemical reagents into a mixture,
 a filter device including a filter connected to an output of the tank for receiving the mixture and separating a solid part and a liquid part of the mixture,
 a treatment device including a further filter connected to the filter device for receiving the liquid part from the filter device and treating the liquid part for discharge from the plant,
 wherein the filter device is positioned below the tank and the treatment device is positioned below the filter device such that the mixture flows from the tank to the filter device only via gravity and the liquid part flows from the filter device to the treatment device only via gravity.

2. The plant according to claim 1, and further comprising a checking device including a vessel operationally positioned between the filter device and the treatment device, the checking device configured to receive the liquid part from the filter device and check if the liquid part is suitable for sending to the treatment device.

3. The plant according to claim 1, wherein the chemical reagent pump is a peristaltic pump.

4. The plant according to claim 1, and further comprising a loading pump controller for controlling the loading pump to keep an amount of the medical waste in the tank between maximum and minimum tank levels, the loading pump controller including a maximum electronic level probe and a minimum electronic level probe.

5. The plant according to claim 1, wherein the filter includes a bag filter.

6. The plant according to claim 1, wherein the mixer is a variable-speed electric mixer.

7. The plant according to claim 1, wherein the further filter device includes a sand filter.

8. The plant according to claim 1, wherein the further filter includes an activated charcoal filter.

9. The plant according to claim 1, wherein the treatment device includes a disinfection device which includes a UV lamp.

10. The plant according to claim 2, wherein the checking device includes a draw-off tap operatively connected to the vessel for drawing off a portion of the liquid part from the vessel, and a multi-way valve operatively connected to the vessel for selectively allowing the liquid part to be sent to the treatment device or to the tank.

11. The plant according to claim 1, and further comprising a treatment apparatus for treatment of expired medicines, and a second loading pump operatively positioned between an output of the treatment apparatus and the tank for transferring treated medicines from the treatment apparatus to the tank.

12. The plant according to claim 11, wherein the treatment apparatus further includes a second container, a grinding roller for grinding the expired medicines and a plurality of mesh grilles in decreasing sizes, the second container, grinding roller and plurality of mesh grills positioned in series in a downward direction such that the expired medicines feed through the treatment apparatus only by gravity.

13. The plant according to claim 12, and further comprising a tap interposed between the grinding roller and the plurality of mesh grills for introducing water into the treatment apparatus to facilitate transit of the treated medicines.

14. A method for treatment of medical waste in a plant, comprising steps as follows:

introducing the medical waste into a collecting container;

transferring with a pump a predetermined quantity of the medical waste from the collecting container to a tank;

drawing chemical reagents from containers in predetermined quantities proportional to the medical waste in the tank and introducing the chemical reagents into the tank;

mixing the medical waste and the chemical reagents with a mixer in the tank to form a mixture;

checking a pH of the mixture in the tank and refining a dosing of chemical reagents into the tank based on the pH;

transferring the mixture from the tank to a filter to separate out a solid part to be sent for disposal, and a liquid part to be subjected to further treatment and then discharged from the plant;

accumulating the liquid part in a vessel;

extracting a sample of the liquid part; and assessing a quality of the liquid part.

15. The method according to claim 14, and further comprising introducing expired medicines into a treatment apparatus for treatment of expired medicines, and transferring, via a pump, a predetermined quantity of treated medicines treated in the treatment apparatus to the tank.

16. The method according to claim 14, and further comprising sending the liquid part to a treatment device before discharge from the plant.

17. The method according to claim 14, and further comprising sending the liquid part to the tank, and repeating a sequence of the steps beginning with the step of drawing chemical reagents from containers.

18. The plant according to claim 1, and further comprising a pH detector probe positioned in the tank, for controlling operation of the chemical reagent pump for regulating an amount of the chemical reagents to the tank to a pH of the mixture in the tank within predetermined limits.

* * * * *